United States Patent
Ruff

(10) Patent No.: US 9,236,788 B2
(45) Date of Patent: Jan. 12, 2016

(54) INDUCTION GENERATOR AND METHOD FOR PRODUCING AN INDUCTION GENERATOR

(75) Inventor: Eduard Ruff, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 231 days.

(21) Appl. No.: 13/991,691

(22) PCT Filed: Dec. 6, 2011

(86) PCT No.: PCT/EP2011/071825
§ 371 (c)(1),
(2), (4) Date: Jun. 5, 2013

(87) PCT Pub. No.: WO2012/097911
PCT Pub. Date: Jul. 26, 2012

(65) Prior Publication Data
US 2013/0285480 A1    Oct. 31, 2013

(30) Foreign Application Priority Data

Jan. 17, 2011    (DE) .......................... 10 2011 002 740

(51) Int. Cl.
| | |
|---|---|
| *H02K 41/02* | (2006.01) |
| *H02K 99/00* | (2014.01) |
| *H02K 7/18* | (2006.01) |

(Continued)

(52) U.S. Cl.
CPC ............ *H02K 57/003* (2013.01); *H02K 7/1876* (2013.01); *H02K 15/00* (2013.01); *H02K 35/02* (2013.01); *Y10T 29/49009* (2015.01)

(58) Field of Classification Search
CPC .... H02K 7/1876; H02K 57/003; H02K 35/02
USPC .................................. 310/12.12; 335/278, 80
See application file for complete search history.

(56) References Cited

U.S. PATENT DOCUMENTS

| | | | |
|---|---|---|---|
| 4,471,353 A | 9/1984 | Cernik | |
| 4,560,966 A | 12/1985 | Nagamoto et al. | |

(Continued)

FOREIGN PATENT DOCUMENTS

| | | |
|---|---|---|
| CH | 304063 | 12/1954 |
| DE | 101 25 059 A1 | 12/2002 |

(Continued)

OTHER PUBLICATIONS

German Search Report Corresponding to 10 2011 002 740.8 mailed Sep. 6, 2011.

(Continued)

*Primary Examiner* — Hanh Nguyen
(74) *Attorney, Agent, or Firm* — Davis & Bujold, P.L.L.C.; Michael J. Bujold

(57) ABSTRACT

An induction generator (100) for a remote switch which comprises a U-shaped magnetic diverter (102) with first and second limbs as well as a coil core (104) with an induction coil (106) arranged between the limbs. A movable magnetic element (110) is provided for switching the induction generator (100). When the magnetic element (110) is in its first position, the magnetic element (110) is connected with the first limb and the coil core (104) and, when the magnetic element (110) is in its second position, the magnetic element (110) is connected with the coil core (104) and the second limb.

7 Claims, 5 Drawing Sheets

(51) Int. Cl.
*H02K 35/02* (2006.01)
*H02K 15/00* (2006.01)

(56) References Cited

U.S. PATENT DOCUMENTS

| | | | |
|---|---|---|---|
| 4,626,813 | A | 12/1986 | Koga et al. |
| 5,568,005 | A * | 10/1996 | Davidson ................. 310/328 |
| 8,228,151 | B2 | 7/2012 | Schmidt |
| 2004/0036561 | A1* | 2/2004 | Reiter ...................... 335/80 |
| 2005/0035600 | A1 | 2/2005 | Albsmeier et al. |
| 2005/0082912 | A1 | 4/2005 | Junger et al. |

FOREIGN PATENT DOCUMENTS

| | | |
|---|---|---|
| DE | 103 01 192 A1 | 7/2004 |
| DE | 103 15 765 A1 | 11/2004 |
| EP | 0 130 423 A2 | 1/1985 |
| EP | 0 836 166 A1 | 4/1998 |
| JP | 59-003904 A | 1/1984 |
| WO | 2004/093299 A1 | 10/2004 |
| WO | 2009/003399 A1 | 8/2009 |

OTHER PUBLICATIONS

International Search Corresponding to PCT/EP2011/071825 mailed Oct. 17, 2012.

Written Opinion Corresponding to PCT/EP2011/071825 mailed Oct. 17, 2012.

* cited by examiner

INDUCTION GENERATOR AND METHOD FOR PRODUCING AN INDUCTION GENERATOR

This application is a National Stage completion of PCT/EP2011/071825 filed Dec. 6, 2011, which claims priority from German patent application serial no. 10 2011 002 740.8 filed Jan. 17, 2011.

FIELD OF THE INVENTION

The present invention relates to an induction generator, a remote switch, a method for producing an induction generator and a method for producing an electric voltage by means of an induction generator, which for example can be used in connection with a remote switch.

BACKGROUND OF THE INVENTION

DE 101 25 059 A1 describes an inductive voltage generator which comprises a mechanical energy storage device. The energy storage device stores actuation energy until a transition point has been reached, after reaching which a permanent magnet of the induction system undergoes an abrupt movement. As a result of this movement the magnetic flux changes abruptly and at the beginning or end of its movement the permanent magnet strikes the core.

An inductive voltage generator can be used in connection with a remote switch. At present, however, a great deal of mechanical energy is needed in order to be able to produce enough electrical energy to operate the remote switch.

SUMMARY OF THE INVENTION

Against this background the present invention provides an improved induction generator, an improved remote switch, an improved method for producing an electrical voltage by means of an induction generator and an improved method for making an induction generator. Advantageous design features emerge from the description given below.

The approach according to the invention is based on an E-shaped magnet core such that a central arm of the magnet core serves to support a coil. If a magnet, starting from a first position in which the magnet completes a first magnetic circuit by way of a first one of the outer arms and the central arm of the magnet core, the magnet then moves to a second position in which the magnet completes a second magnetic circuit by way of a second one of the outer arms and the central arm of the magnet core, then the direction of the magnetic flux through the central arm of the magnet core changes. This produces an electrical voltage between electric terminals of the coil. The electrical voltage can be used for operating an electric device, for example a radio interface of a remote switch. In turn, the magnet can be moved by actuating a switch, for example the remote switch.

With a generator based on this principle only a small amount of mechanical energy is needed in order to be able to produce enough electrical energy to operate a simple electric circuit. Accordingly, the generator has high efficiency. Furthermore, with this generator the magnetic flux density in the mechanical separation zone between the coil core and the magnets can be optimized. In this way the distribution of the magnetic flux density in the magnetic circuits can be improved. In addition the structure of the generator enables production costs to be reduced.

The present invention provides an induction generator for a remote switch having the following characteristics:

a U-shaped magnetic diverter with a first limb, a second limb positioned close to the first limb and a connecting section for connecting the first and second limbs;

a coil core arranged between the first and second limbs of the magnetic diverter and connected to the connecting section of the magnetic diverter;

an induction coil arranged on the coil core between the first and second limbs of the magnetic diverter; and a movable magnetic element having a first contact area and a second contact area, such that in a first position of the magnetic element the first contact area adjoins the first limb and the second contact area adjoins the coil core, while in a second position of the magnetic element the first contact area adjoins the coil core and the second contact area adjoins the second limb.

A remote switch can be used, for example, for an automobile key or a light switch. The induction generator can be designed such that when the remote switch is actuated it provides enough electrical energy to transmit information about the actuation of the remote switch by way of a radio interface. These fields of application of a remote switch are selected as examples. More generally, the induction generator can be used anywhere where a conversion of mechanical energy to electrical energy is needed or expedient. The magnetic diverter and the coil core can be made of a material with high magnetic conductivity, in particular a ferromagnetic material. The magnetic diverter can be made integrally, for example in the form of a plate bent into a U shape. If the magnetic diverter is made of individual parts, the individual parts can be connected together in such manner that a magnetic flux through the magnetic diverter is not interrupted, i.e. for example they are directly adjacent to one another. The length of the first limb can be equal to that of the second limb of the magnetic diverter. Thus, the limbs can be arranged parallel to one another. The magnetic diverter and the coil core can be arranged in the same plane. The coil core can be solidly connected to the magnetic diverter. The connection between the coil core and the magnetic diverter can have a high magnetic conductivity. The induction coil can have a large number of wire windings around the coil core. The windings can occupy a space between the coil core and the limbs of the magnetic diverter. The induction coil can have electric contacts via which a voltage produced by the induction coil can be tapped. The contacts can form an electrical interface of the induction generator. The magnetic element can be a permanent magnet or can comprise a permanent magnet. Instead of a permanent magnet some other element suitable for producing the necessary magnetic field can be used. The contact areas of the magnetic element can comprise projections arranged on opposite edges of the magnetic element. The contact areas can be surfaces of the magnetic element or can be formed by pole-pieces arranged on the poles of the permanent magnet. The pole-pieces can consist of a ferromagnetic material. The first contact area can form a magnetic South pole and the second contact area a magnetic North pole. The magnetic element can be moved between the first and the second position by a suitable guiding device. The movement of the magnetic element can be linear. The coil core and the limbs of the magnetic diverter can in each case have stop surfaces for the contact areas of the magnetic element. The magnetic element can comprise a mechanical interface of the induction generator to an actuating device. The actuating device can be for example a switch. In the first position of the magnetic element the first contact area of the magnetic element can adjoin the first limb and the second contact area can adjoin the coil core. 'Adjoin' can mean that the contact areas of the magnetic element may be directly in contact with the corresponding limb and magnet core or be very close to them, so that any magnetic resistance between the contact areas and the corresponding limb and magnet core is minimized. If the magnetic element is in its first position, a first magnetic circuit with low magnetic resistance is completed, which passes through the first contact area, the first limb and part of the connecting section of the magnetic diverter, the coil core and the second contact area. In the second position the second contact area can adjoin the second limb and the first contact area can adjoin the coil core. Thus, if the magnetic element is in the second position, a second magnetic circuit with low magnetic resistance is completed, which passes through the first contact area, the coil core, part of the connecting section, the first limb of the magnetic diverter and the second contact area. Corresponding contact surfaces between the contact areas and the limbs and the coil core can be shaped to match one another. For example, the contact faces can all be flat. Advantageously, a magnetic direction of the magnetic flux changes when the magnetic element changes from the first to the second position, but only in the coil core and not in the magnetic diverter.

In one embodiment, the magnetic element can comprise a first pole-piece that forms the first contact area and a second pole-piece that forms the second contact area. In this way free ends of the first and second pole-pieces can overlap, respectively, with free ends of the coil core and of the first and second limbs. The free ends of the coil core and of the limbs can be the ends of the coil core and limbs opposite the section connecting the coil core and the limbs. The free ends of the pole-pieces can project beyond a permanent magnet of the magnetic element. Thus, the first pole-piece can project into a space between the first limb and the coil core and the second pole-piece can project into a space between the second limb and the coil core. The longitudinal extension directions of the free ends of the pole-pieces can correspond to longitudinal extension directions of the free ends of the limbs and the coil core. By virtue of the overlap the contact areas between the magnetic element and the limbs and coil core can be made very large. In this way the magnetic flux density at the contact surfaces can be optimized so that both a good magnetic flux takes place via the contact faces and also the contact faces can be easily separated when the magnetic element moves.

A line connecting a South pole and a North pole of the magnetic element can extend transversely to a longitudinal extension direction of the coil core. Thus for example, the South pole is arranged on the side facing toward the first limb and the North pole on the side facing the second limb. In this way the pole-pieces can be made very simply, in particular straight. Furthermore the two pole-pieces can be identical or at least shaped with essentially identical geometrical forms. In this way, for one thing weight and for another production costs can be saved.

The coil core can comprise a supporting section for carrying the induction coil and a contact section for contacting the first and second contact areas. In that case a cross-section through the contact section can be larger than a cross-section through the supporting section. The contact section can have two opposite contact surfaces. The windings of the induction coil can be arranged along the supporting section. Owing to the small cross-section of the supporting section the diameter of the induction coil can be kept small. On the other hand, thanks to the large cross-section of the contact section the flux density at the interfaces with the contact areas of the magnetic element can be kept low. This in turn makes it easier to separate the contact areas of the magnetic element from the coil core.

Correspondingly, the first and second limbs can in each case have a section that spans across the induction coil and a contact section for contacting the first and second contact areas. In that case a cross-section through the over-spanning sections can in each case be larger than the cross-section through the contact sections. The over-spanning sections can span across the full length of the induction coil. Since the cross-section of the over-spanning sections is larger than the cross-section of the contact sections, the width of the over-spanning sections can correspond to the width of the induction coil. In contrast, the contact sections can be matched to a smaller width of the contact areas on the magnetic element.

According to one embodiment, the connecting section can have an opening for receiving the end section of the coil core. In this way the coil core can be connected to the magnetic diverter by inserting its end section into the opening.

Furthermore, the induction generator can comprise an actuating device for moving the magnetic element between its first position and its second position. By means of the actuating device the magnetic element can also be moved from its second to its first position. By operating the actuating device the magnetic element can be moved from the first to the second position and back again. For this purpose the actuating device can have a suitable mechanism. The actuating device can be operated manually.

The present invention also provides a remote switch having the following characteristics:
a switch element;
an induction generator according to an embodiment of the present invention, wherein the magnetic element of the induction generator is coupled to the switch element in order to be moved from the first position to the second position when the switch element is actuated; and
a transmission device for the wireless transmission of information about an actuation of the switch element, such that electric contacts of the transmission device are connected to electric contacts of the induction coil.

The switch element can comprise a switch, which can be actuated manually or by a triggering device, for example a sensor. The switch element can also comprise a suitable mechanism, by means of which it is coupled to the magnetic element. In this way a switching process of the switch element can bring about a movement of the magnetic element. The transmission device can comprise an antenna. Moreover, the transmission device can comprise an electronic system for evaluating a voltage produced by the induction coil and for controlling the antenna in accordance with the voltage produced. Correspondingly, the electric contacts of the induction coil can be connected to contacts of the antenna or of the electronic system.

The present invention also provides a method for producing an electric voltage by means of an induction generator, wherein the induction generator comprises a U-shaped magnetic diverter with a first limb, a second limb positioned close to the first limb and a connecting section for joining the first and second limbs, as well as a coil core that is arranged between the first and second limbs of the magnetic diverter and connected to the connecting section of the magnetic diverter, and an induction coil arranged on the coil core between the first and second limbs of the magnetic diverter, as well as a movable magnetic element with a first contact area and a second contact area, such that in a first position of the magnetic element the first contact area adjoins the first limb and the second contact area adjoins the coil core whereas in a second position of the magnetic element the first contact area adjoins the coil core and the second contact area adjoins the second limb, the method having the following step:

moving the magnetic element from the first position to the second position.

Furthermore, the present invention provides a method for producing an induction generator for a remote switch, which method comprises the following steps:

arranging an induction coil on a coil core;

preparing a U-shaped magnetic diverter with a first limb, a second limb positioned close to the first limb, and a connecting section for joining the first and second limbs;

connecting the coil core to the connecting section of the magnetic diverter so that the induction coil is positioned between the first and the second limbs;

preparing a magnetic element with a first contact area and a second contact area; and arranging the magnetic element close to the coil core and the limbs of the magnetic diverter in such manner that it can move between a first position and a second position, such that in the first position of the magnetic element the first contact area adjoins the first limb and the second contact area adjoins the coil core, whereas in the second position of the magnetic element the first contact area adjoins the coil core and the second contact area adjoins the second limb.

The coil core can be connected to the magnetic diverter by friction force, or in an interlocked manner or by material-merging. For example, the coil core can be connected to the magnetic diverter by means of an insertion joint. Since the coil core is first connected to the induction coil, the induction generator can be produced very simply and inexpensively.

BRIEF DESCRIPTION OF THE DRAWINGS

The invention will be explained in greater detail with reference to the attached drawings of examples, which show.

DETAILED DESCRIPTION OF THE PREFERRED EMBODIMENTS

In the following description of preferred example embodiments of the present invention, the same or similar indexes are used for elements in the various figures that work in a similar manner, so that repeated descriptions of the elements need not be given.

Figure 1A:
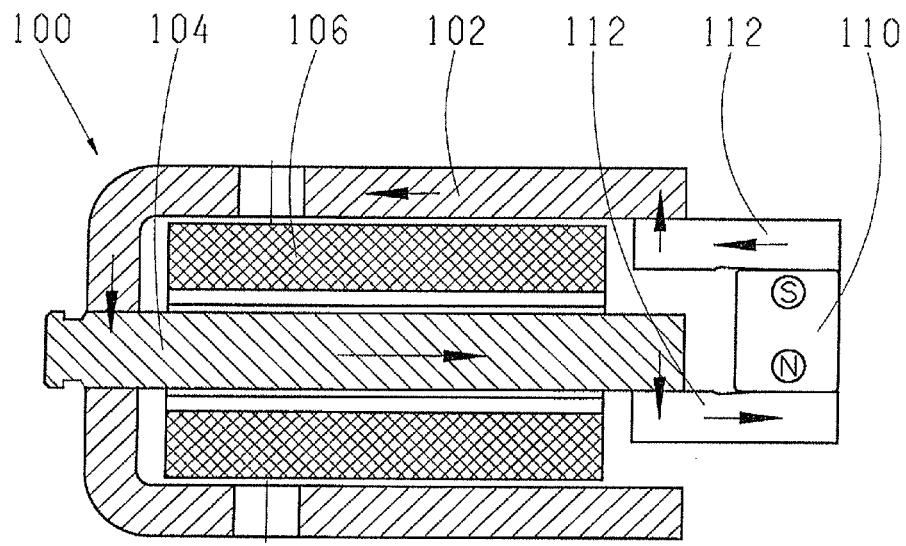
FIGS. 1a and 1b: An induction generator in different switch positions, according to an example embodiment of the present invention.

FIG. 1a shows a sectional view of an induction generator 100 according to an example embodiment of the present invention. The induction generator 100 comprises a magnetic diverter 102, a coil core 104 and a coil 106. In addition the induction generator 100 comprises a magnetic element with a permanent magnet 110 and two pole-pieces 112.

The magnetic diverter 102 is U-shaped and has two parallel limbs and a connecting section for connecting the limbs. The connecting section has in the middle a through-going opening. The coil core 104 is rod-shaped. An end section of the coil core 104 is pushed through the opening of the connecting section of the magnetic diverter 102. The coil core 104 is arranged parallel to the limbs of the magnetic diverter 102, mid-way between them. The coil 106 has a large number of turns which are wound around the coil core 104. The coil 106 can fill a space between the coil core 104 and the limbs of the magnetic diverter 102. A layer of electric insulation can be arranged in each case between the coil and the coil core 104 and between the coil 106 and the magnetic diverter 102. Free ends of the limbs of the magnetic diverter 102 and of the coil core 104 project over an end of the coil 106 that faces toward the magnetic element. Extensions of the free ends can each be of equal length so that the limbs and the coil core end flush with one another. The free ends of the limbs and the coil core form contact sections for the pole-pieces 112 of the magnetic element.

The permanent magnet 110 has a magnetic North pole and a magnetic South pole. Relative to the magnetic diverter 102 the permanent magnet 110 is orientated in such manner that a first pole of the permanent magnet 110 is on the side of a first limb and a second pole of the permanent magnet 110 is on the side of the other limb. Thus, the magnetic field lines run inside the permanent magnet 110 transversely to a longitudinal extension direction of the coil core 104 or, expressed otherwise, parallel to a notional line connecting the limbs of the magnetic diverter 102. The permanent magnet 110 is rectangular. The pole-pieces 112 are in the form of plates arranged on the two sides of the permanent magnet 110. In particular, the pole-pieces 112 are arranged on the end faces of the permanent magnet 110 that form the poles. Each pole-piece 112 extends beyond the permanent magnet 110. The extension is on the side of the permanent magnet 110 facing toward the coil 106. The permanent magnet 110 is positioned a distance away from an end face of the coil core 104. By virtue of the extensions of the pole-pieces 112 the pole-pieces 112 project into an intermediate space between the coil core 104 and the limbs of the magnetic diverter 102. The permanent magnet 110 is arranged so that a first one of the pole-pieces 112 projects into the intermediate space between the coil core 104 and a first one of the limbs of the magnetic diverter 102 and a second pole-piece 112 projects into the intermediate space between the coil core 104 and the second of the limbs of the magnetic diverter 102. A distance between a contact surface of the first pole-piece 112 facing toward the first limb and a contact surface of the second pole-piece 112 facing toward the coil core 104 is equal to a distance between a contact surface of the first limb facing toward the first pole-piece 112 and a contact surface of the coil core 104 facing toward the second pole-piece 112.

The magnetic element consisting of the permanent magnet 110 and the pole-pieces 112 can undergo a movement relative to the coil core 104 and the magnetic diverter 102. For this purpose the magnetic element is arranged so that it can move. In particular, the magnetic element can move along a notional line joining the limbs of the magnetic diverter 102. In a first position the magnetic element is deflected toward the first limb. In that case a first contact surface of the first pole-piece 112 is in contact with a contact surface of the first limb and a first contact surface of the second pole-piece 112 is in contact with a first contact surface of the coil core 104. In a second position the magnetic element is deflected toward the second limb. In that case a second contact surface of the first pole-piece 112 is in contact with a second contact surface of the coil core 104 and a second contact surface of the second pole-piece 112 is in contact with a contact surface of the second limb. The first and second contact surfaces of the pole-pieces 112 are respectively arranged opposite one another. Likewise, the first and second contact surfaces of the coil core pole-piece 112 are arranged opposite one another. As indicated by the arrows, in the first position a magnetic flux passes through the first pole-piece 112 into the first limb of the magnetic diverter 102, out of the connecting section of the magnetic diverter 102 into the coil core 104, and out of the coil core 104 into the second pole-piece 112.

Figure 1B:
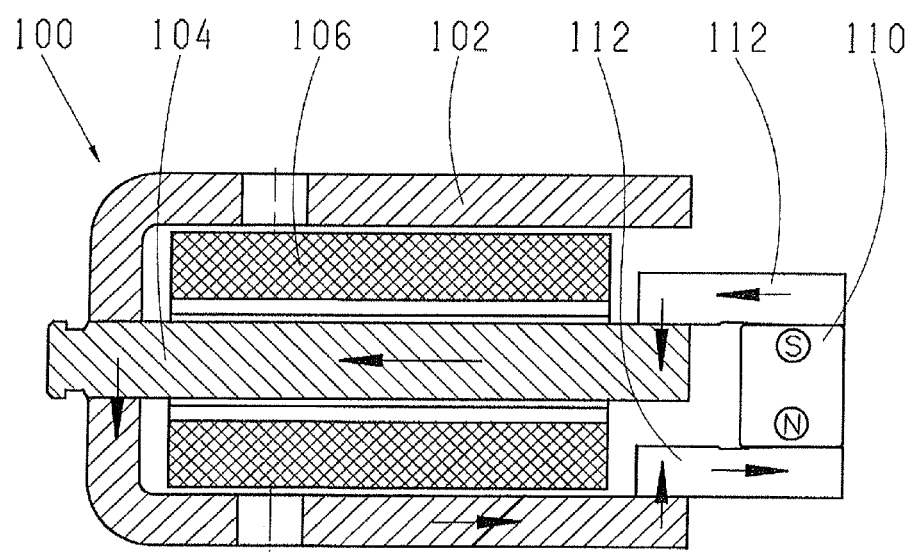

FIG. 1b shows a sectional view of the induction generator 100 shown in FIG. 1a in the second position, according to an example embodiment of the present invention. As indicated by the arrows, in the second position a magnetic flux can pass through the first pole-piece 112 into the coil core 104, out of the coil core 104 into the connecting section of the magnetic diverter 102 and out of the second limb of the magnetic diverter 102 into the second pole-piece 112.

If the magnetic element is in its first position, a magnetic flux direction in the coil core 104 is opposite to a magnetic flux direction in the coil core 104 when the magnetic element is in its second position. When the magnetic element changes from the first to the second position or vice-versa, the flux direction in the coil core 104 is reversed and a voltage is induced in the coil 106. In this way the mechanical energy used to move the magnetic element is converted into electrical energy.

The structure illustrated in FIGS. 1a and 1b improves the efficiency of the generator since the magnetic flux in the core 104 is as high as it can be. Likewise, the flux density in the coil area is as high as possible, so as to keep the size of the coil 106 small. Furthermore, the losses in the rest of the magnetic circuit are as low as possible. As can be seen from FIGS. 1a and 1b, the magnet core is not U-shaped but E-shaped and it consists of the coil core 104 and the magnetic diverter 102.

Figure 2A:
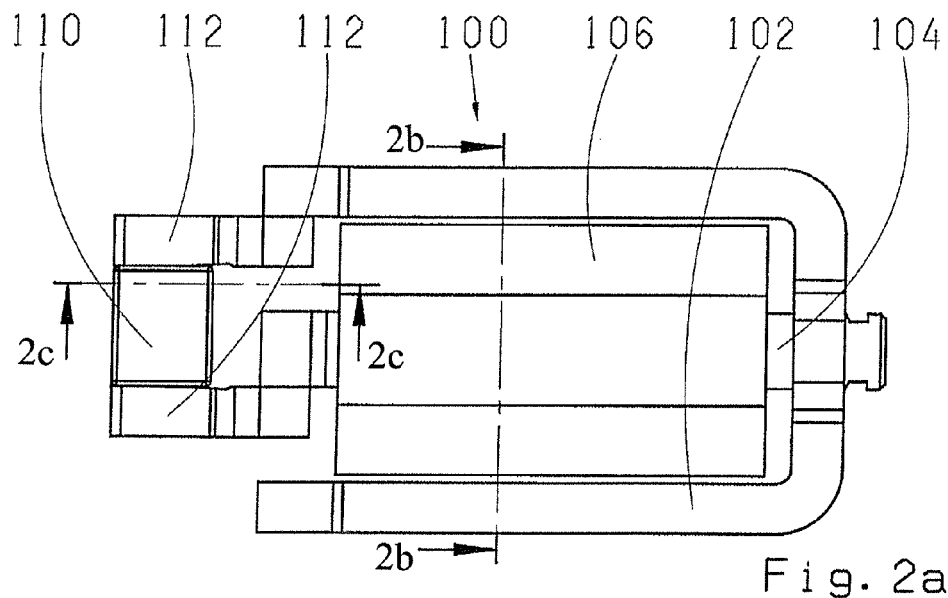
FIGS. 2a to 2c: Sectioned views of an induction generator according to an example embodiment of the present invention.
Figure 2B:
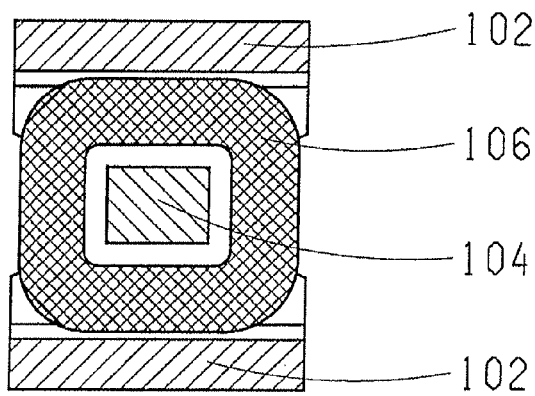

FIGS. 2a and 2b show sectioned views of an induction generator 100 according to an example embodiment of the present invention. The structure of this induction generator 100 can correspond to that of the induction generator 100 shown in FIGS. 1a and 1b.

From FIG. 2a it can be seen that an end section of the coil core 104 passes through the connecting section of the magnetic diverter 102 and, on the side of the magnetic diverter 102 opposite the coil 106, has a projection with a groove.

FIG. 2b shows a view of the induction generator 100 in FIG. 2a, sectioned along the line 2b-2b. The section line passes through the limbs of the magnetic diverter 102, the coil 106 and the coil core 104. The coil core 104 has a rectangular cross-section. The width of the limbs of the magnetic diverter 102 corresponds to or is slightly larger than the width of the coil 106. The thickness of the limbs of the magnetic diverter 102 is smaller than the width of the limbs. Also, the thickness of the limbs is smaller than the thickness of the coil core 104.

Figure 2C:
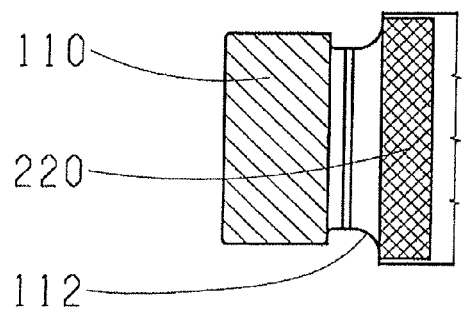

FIG. 2c shows a view of the induction generator 100 in FIG. 2a sectioned along the section line E-E. The section line passes through the permanent magnet 110. The figure shows an area of the pole-piece 112 and indicates an interface 220 between the magnetic diverter 102 and the pole-piece 112. In the area of the interface 220 the width of the pole-piece 112 corresponds to or is slightly smaller than the width of the magnetic diverter in the area of the interface 220. Between the permanent magnet 110 and the interface 220 the width of the pole-piece 112 narrows.

To reduce the holding force between the pole-pieces 112 and the magnetic diverter 102 and the coil core 104, the flux density at the interfaces 220 should be as low as possible. This is achieved by enlarging the interface 220 between the magnetic diverter 102 and coil core 104 and the pole-pieces 112. If the holding force is lower, then so too is the mechanical force needed in order to activate the generator.

In this case the total magnetic flux in the magnetic circuit is at least not reduced.

$F = B^2 \times A / 2\mu_0$ $B$ = flux density $A$ = area of the interface $\mu_0$ = magnetic field constant To enlarge the interface between the pole-pieces 112 and the magnetic diverter 102 and coil core 104, the cross-sections of the magnetic diverter 102 and coil core 104 are correspondingly adapted in the area of the interface 220 as shown in FIG. 2c. At the same time the enlargement of the cross-sectional area of the magnetic diverter 102 serves to reduce losses throughout the magnetic circuit.

As mentioned earlier, the cross-section of the coil core 104 is only enlarged in the interface area 220 so as to reduce the flux density at that point. Over the length of the coil core 104 its cross-section is made as small as possible, for example just large enough to avoid magnetic saturation. This enables the coil 106 to be made as compact as possible and the individual winding lengths and hence the electric resistance of individual windings to be kept as low as possible. Besides minimizing the cross-section along the length of the coil core 104, the cross-section is made to be as square as possible. The more square are the coil core 104 and the coil 106 wound onto it, the lower are the coil resistance and the losses in the coil 106. An appropriate design is shown in FIG. 2b.

Figure 3:
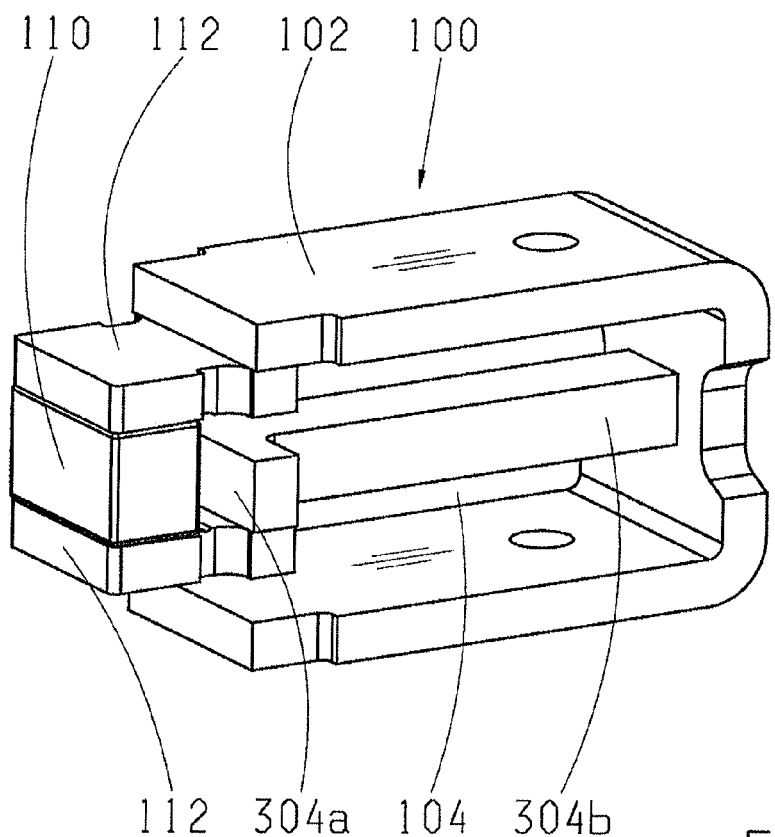
FIG. 3: An induction generator according to an example embodiment of the present invention.

FIG. 3 shows a view of the induction generator 100 according to an example embodiment of the present invention, wherein the coil of the induction generator 100 is not shown. In other respects the structure of the induction generator 100 can correspond to the structure of the induction generator 100 shown in FIG. 1a.

Over its full length the magnetic diverter 102 has a uniform thickness. In the area of the interfaces with the pole-pieces 112, the limbs of the magnetic diverter 102 are less wide than in another area of the limbs extending down to the connecting section. The width of the connecting section corresponds to that of the limbs but at the level of the through-going opening for the coil core 104, the connecting section is less wide. Close to the connecting section, the limbs of the magnetic diverter 102 have two respective round holes.

The permanent magnet 110 is of parallelepiped shape. The pole-pieces 112 lie flat against the respective surfaces of the permanent magnet 110, which they cover completely. Other surfaces of the permanent magnet 110 are not contacted or spanned across by the pole-pieces 112.

The coil core has as large as possible a cross-section in the interface area 304a with the pole-pieces 112. In the coil area 304b, the coil core 104 has a smaller, approximately square cross-section.

Figure 4:
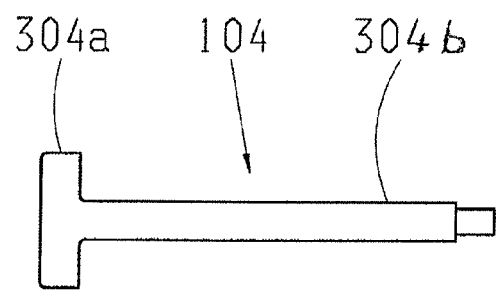
FIG. 4: A coil core for an induction generator according to an example embodiment of the present invention.

FIG. 4 shows a coil core 104 for an induction generator 100 according to an example embodiment of the present invention. This coil core 104 could be the coil core 104 of the induction generator 100 shown in FIG. 3. In the section 304a the coil core 104 is wider than in the section 304b. For example, the width of the section 304a could be twice the width of the section 304b. The thickness of the coil core 104 in the areas 304a, 304b can be equal. At an end opposite the section 304a the thickness of the coil core 104 is smaller than in its section 304b.

Figure 5:
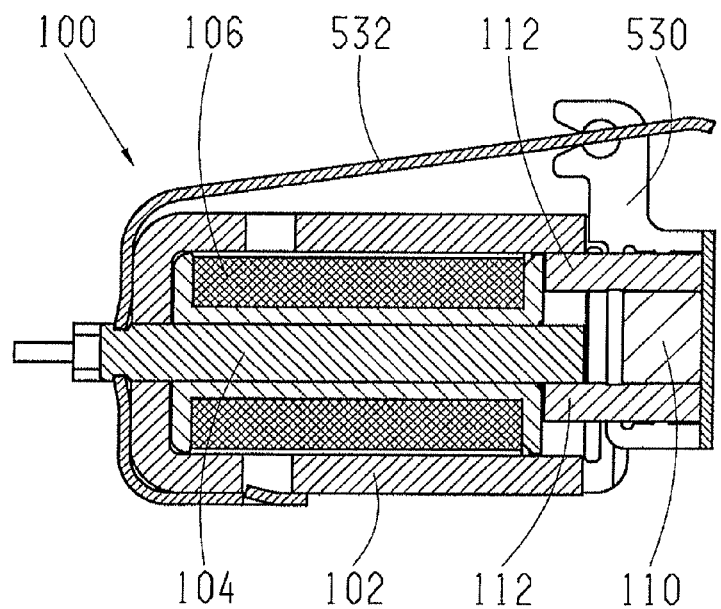
FIG. 5: An induction generator according to an example embodiment of the present invention.

As can be seen from the schematic representations in FIGS. 4 and 5, the cross-section between the coil core 104 and the interfaces or separation surfaces to the pole-pieces 112 is different, in order to reduce the flux density in the area of the interfaces. Accordingly, the coil core 104 is T-shaped.

The magnet 110 and the entire magnet block are simple and inexpensive to produce. In this case a simple permanent magnet is used in the magnet block, to the end faces of which a pole-piece 112 is attached in each case. The pole-pieces 112 used to conduct the magnetic flux are geometrically simple and above all identical. By using identical pole-pieces 112, these can be produced in larger production runs and therefore more inexpensively.

The permanent magnet 110 and the pole-pieces 112 can either be overmolded or, better still, snap-fitted into a metallic cage. By using pole-pieces of geometrically simple design the magnet block becomes very much cheaper. Furthermore, the magnet block can be very small and light. Thanks to a lower mass moment of inertia its acceleration is then better.

Compared with a U-shaped coil core the enlargement of the magnetic diverter 102 incurs almost no additional costs, since the material for the magnetic diverter 102 is very cheap. Rather, by the saving of a coil and the simpler pole-pieces 112 a large component is saved.

The arms of the magnetic diverter 102 and the two pole-pieces 112 are magnetized only in one direction, for example only as a South or North pole, and only the coil core 104 is completely demagnetized in a cycle, for example from North to South or vice-versa. In this way the magnetic losses in the magnetic diverter 102 and the pole-pieces 112 are lower than in the coil core 104. This enables cheaper magnetic materials to be used for the magnetic diverter 102 and the pole-pieces 112.

The generator can be made very compact and thus enables optimum use of space.

As already known, the magnets 110, 112 are actuated in a conventional manner, for example in a non-linear or linear manner.

Figure 6:
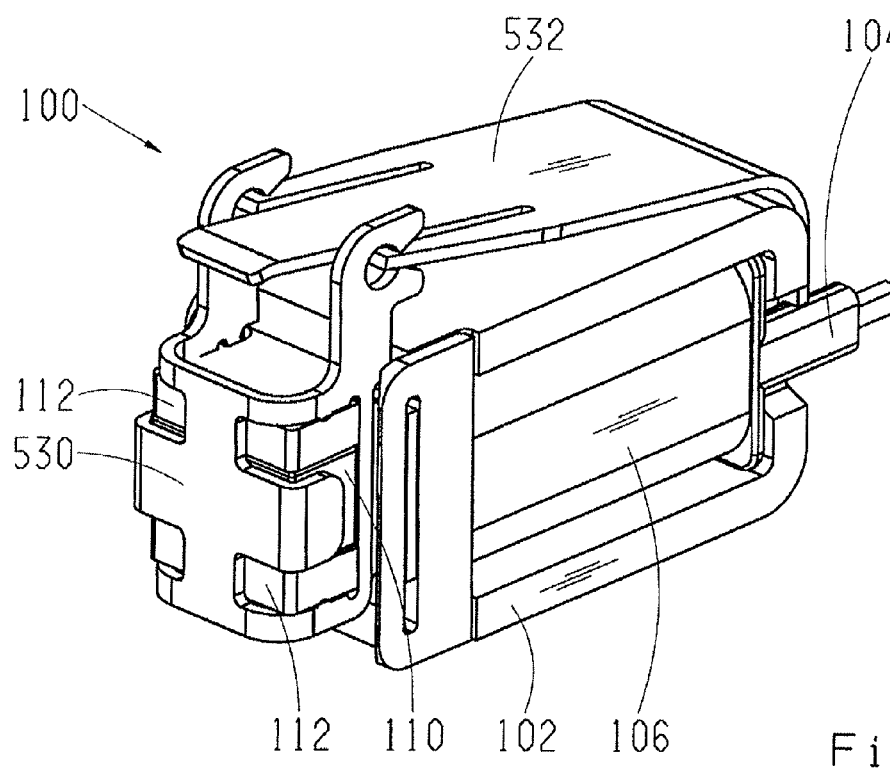
FIG. 6: An induction generator according to an example embodiment of the present invention.

FIGS. 5 and 6 show further views of a generator according to example embodiments of the present invention. In each case the generator can be configured as is the induction generator 100 described with reference to FIG. 1a.

The figures show a metallic cage 530 which encloses the permanent magnet 110 and the pole-pieces 112. The permanent magnet 110 and pole-pieces 112 can be held together by the metal cage 530. The metal cage 530 comprises two opposite extensions which extend beyond one of the limbs of the magnetic diverter 102. The extensions are coupled to an actuator 532. The actuator 532 can be in the form of a spring element. In the rest position a first area of the actuator 532 is arranged a short distance away from the limb of the magnetic diverter 102 closest to it. A second area of the actuator 532 passes round the connecting section of the magnetic diverter 102 and is in contact therewith. This second area can engage in a groove formed in an end section of the coil core 104 that passes through the connecting section of the magnetic diverter 102. A third area of the actuator 532 extends along the other limb of the magnetic diverter 102 as far as an opening in the other limb, and hooked into the opening.

When the actuator 532 is operated, the first area thereof is pressed by a force acting on the actuator 532 in the direction toward the nearby limb of the magnetic diverter 120. The metal cage 530, being coupled to the actuator 532, is moved so that the permanent magnet 110 with the pole-pieces 112 moves from the position shown in FIG. 1a to the position shown in FIG. 1b. After operation of the actuator 532, the first area of the actuator 532 can move back to its starting position, under the action of a restoring force, for example the force of a spring. Thereby, by virtue of its coupling with the actuator 532 the permanent magnet 110 is moved from the position shown in FIG. 1b to the position shown in FIG. 1a.

Figure 7:
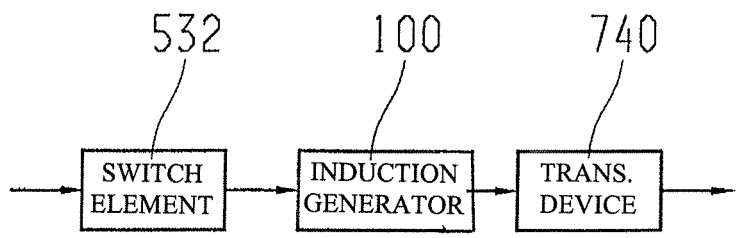
FIG. 7: A schematic representation of a remote switch according to an example embodiment of the present invention.

FIG. 7 shows a schematic representation of a remote switch according to an example embodiment of the present invention. The remote switch comprises a switch element 532, an induction generator 100 and a transmission device 740. The induction generator 100 can be the induction generator 100 illustrated in FIGS. 5 and 6. Accordingly, the switch element 532 can be the actuator 532 shown. The transmission device 740 is designed to transmit information about actuation of the switch element 532 by way of a radio interface. The energy required for operating the transmission device 740 can be produced by the induction generator 100 since the induction generator 100 is operated by actuating the switch element 532.

Thus, a force acting on the switch element 532 brings about a movement of the magnetic element of the induction generator 100. As a result the induction generator 100 produces electrical energy, which can be supplied to the transmission device 740 via electric contacts. The electrical energy is used by the transmission device 740 to transmit the information about the actuation of the switch element 532.

Figure 8:
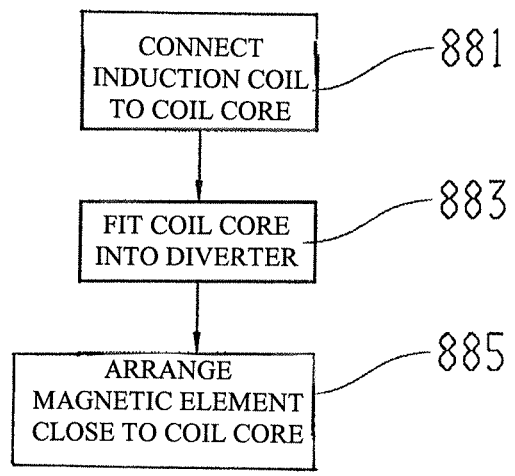
FIG. 8: A sequence diagram of a method for producing an induction generator according to an example embodiment of the present invention.

FIG. 8 shows a sequence diagram of a method for producing an induction generator according to an example embodiment of the present invention. In a step 881 an induction coil is fixed onto a coil core. Then, in step 883 the coil core with its coil are fitted into a U-shaped magnetic diverter or outer core. In a step 885 a magnetic element is arranged close to the coil core and the magnetic diverter in such manner that it can move. The magnetic element can be coupled with an actuator device by means of which the magnetic element can be moved and the induction generator 100 correspondingly operated.

In an example embodiment the coil core is made separately, provided with the coil, and then fitted together with the coil into the magnetic diverter. For this, the coil core with coil can be plugged into the magnetic diverter, and only one coil is used. The permanent magnet is provided with two simple and identical pole-pieces.

The example embodiments described and illustrated in the figures have only been chosen as examples. Different example embodiments can be combined with one another completely or as regards individual features. An example embodiment can also be supplemented by features of another example embodiment. The dimensions and geometrical shapes of the elements described are only examples and can be adapted to suit the respective fields of use of the induction generator.

INDEXES

100 Induction generator
102 Magnetic diverter
104 Coil core
106 Coil
110 Magnet
112 Pole-piece
220 Interface
304a Area of the coil core
304b Area of the coil core
530 Metallic cage
532 Actuator
740 Transmission device

The invention claimed is:
1. A remote switch comprising:
a switch element (532);

an induction generator (100) comprising a U-shaped magnetic diverter (102) with a first limb, a second limb, positioned adjacent the first limb, and a connecting section joining the first limb with the second limb;

a coil core (104) being connected to the connecting section of the magnetic diverter and arranged between the first limb and the second limb;

an induction coil (106) being arranged on the coil core between the first limb and the second limb;

a movable magnetic element (110), comprising a first contact area (112) and a second contact area (112), having first and second positions;

the first contact area adjoins the first limb and the second contact area adjoins the coil core in the first position of the magnetic element;

the first contact area adjoins the coil core and the second contact area adjoins the second limb in the second position of the magnetic element;

the magnetic element (110) of the induction generator being coupled to the switch element such that when the switch element is actuated, the magnetic element being moved from the first position to the second position; and a transmission device (740) for wireless transmission of information, about actuation of the switch element, such that electric contacts of the transmission device are connected to electric contacts of the induction coil (106).

2. The remote switch according to claim 1, wherein the magnetic element has a first pole-piece (112) which forms the first contact area and a second pole-piece (112) which forms the second contact area, and free ends of the first and the second pole-pieces overlap with free ends of the coil core (104) and of the first and the second limbs.

3. The remote switch according to claim 1, wherein a line that joins a south pole and a north pole, of the magnetic element (110), extends transversely to a longitudinal extension direction of the coil core (104).

4. The remote switch according to claim 1, wherein the coil core (104) comprises a supporting section for supporting the induction coil (106) and a contact section for contacting the first and the second contact areas, and a cross-section through the contact section is greater than a cross-section through the supporting section.

5. The remote switch according to claim 1, wherein the first and the second limbs each have a section for spanning over the induction coil (106) and a contact section for contacting the first and the second contact areas, and a cross-section through the over-spanning sections is, in each case, greater than a cross-section through the contact sections.

6. The remote switch according to claim 1, wherein the connecting section has an opening for receiving an end section of the coil core (104).

7. The remote switch according to claim 1, wherein the induction generator has an actuator (532) which moves the magnetic element (110) between the first position and the second position.

* * * * *